(12) United States Patent
Vanmechelen et al.

(10) Patent No.: US 6,896,110 B2
(45) Date of Patent: May 24, 2005

(54) TEMPERATURE COMPENSATED DUAL ACTING SLIP

(75) Inventors: Patrick Vanmechelen, Sint-Truiden (BE); David Holiviers, Sint-Truiden (BE); Rudi Schurmans, Nieuwerterken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 26 days.

(21) Appl. No.: 10/670,584

(22) Filed: Sep. 25, 2003

(65) Prior Publication Data

US 2005/0067242 A1    Mar. 31, 2005

(51) Int. Cl.[7] ................................................. F16F 9/36
(52) U.S. Cl. ................................ 188/322.17; 277/384
(58) Field of Search .................. 188/322.17; 277/434, 277/435, 377, 379, 384, 280, 282

(56) References Cited

U.S. PATENT DOCUMENTS

| | | | |
|---|---|---|---|
| 2,182,034 A | 12/1939 | Von Oberstadt | |
| 2,498,802 A | 2/1950 | Funkhouser | |
| 2,695,079 A | 11/1954 | Brundrett | |
| 3,203,511 A | 8/1965 | Long, Jr. | |
| 3,621,952 A | 11/1971 | Long, Jr. | |
| 3,730,305 A | 5/1973 | Fouts | |
| 3,981,380 A | 9/1976 | Andre | |
| 4,189,033 A | 2/1980 | Katsumori | |
| 4,729,569 A * | 3/1988 | Muller et al. | 277/584 |
| 4,865,170 A | 9/1989 | Ciepichal | |
| 4,987,826 A * | 1/1991 | Deppert et al. | 92/168 |
| 4,989,701 A * | 2/1991 | Yamaoka et al. | 188/322.17 |
| 5,098,071 A * | 3/1992 | Umetsu | 267/64.27 |
| 5,107,970 A * | 4/1992 | Driessen et al. | 188/322.16 |
| 5,211,268 A | 5/1993 | Lizell et al. | |
| 5,363,945 A * | 11/1994 | Lizell et al. | 188/281 |
| 5,725,239 A | 3/1998 | de Molina | |
| 5,921,166 A * | 7/1999 | Machida et al. | 92/168 |
| 2001/0023638 A1 * | 9/2001 | Yamaguchi et al. | 92/165 R |

* cited by examiner

Primary Examiner—Robert A. Siconolfi
Assistant Examiner—Devon Kramer
(74) Attorney, Agent, or Firm—Harness, Dickey & Pierce, PLC

(57) ABSTRACT

A rod guide assembly for a shock absorber includes a seal assembly which is biased towards a sealing surface on the rod guide by a biasing member which is located between the seal assembly and the bearing which is assembled to the rod guide housing. The biasing of the seal assembly prohibits movement of the seal assembly during operation of the shock absorber. In addition, a wire circlip which radially biases the seal assembly can be included.

12 Claims, 3 Drawing Sheets

TEMPERATURE COMPENSATED DUAL ACTING SLIP

FIELD OF THE INVENTION

The present invention relates to shock absorbers. More particularly, the present invention relates to a unique slip ring which seals the interface between the piston rod and the rod guide.

BACKGROUND OF THE INVENTION

Shock absorbers are used in conjunction with automobile suspension systems and other vehicle suspension systems to absorb unwanted vibrations which occur during operation of the vehicle. To absorb this unwanted vibrations, shock absorbers are connected between the sprung mass (the body) and the unsprung mass (the suspension system) of the vehicle. A monotube shock absorber has a piston which is located within a pressure tube of the shock absorber and the piston is typically connected to the sprung mass of the vehicle using a piston rod. The pressure tube is typically connected to the unsprung mass of the vehicle and it is typically filled with hydraulic fluid. The piston includes valving systems which have the capability to limit the flow of hydraulic fluid within the pressure tube when the shock absorber is compressed (compression stroke) or extended (rebound stroke). The limiting of fluid flow produces a damping force which counteracts the vibrations which would otherwise be transmitted from the suspension (unsprung mass) to the body (sprung mass) of the vehicle.

A dual tube shock absorber comprises a pressure tube with a piston disposed therein and a reserve tube surrounding the pressure tube. The piston divides the pressure tube into an upper and lower working chamber. A piston rod is connected to the piston and the piston rod extends through the upper working chamber of the pressure and through the upper end of the reserve tubes. At the lower end of the pressure tube, a base valve is located between the pressure tube and the reserve tube. The base valve controls fluid flow between the working chamber defined by the pressure tube and a reserve chamber defined by the serve tube. Due to the piston rod being located on only one side of the piston within the upper working chamber, a different amount of fluid is displaced between the upper working chamber above the piston and the lower working chamber below the piston when the shock absorber extends or compresses. This difference in the amount of fluid is termed the "rod volume". During a compression stroke, the "rod volume" flows out of the lower working chamber through the base valve and into the reserve chamber. During a rebound or extension stroke, the "rod volume" flows out of the reserve chamber through the base valve and into the lower working chamber. The piston rod is typically connected to the unsprung mass of the vehicle and the reserve tube is typically secured to the unsprung mass of the vehicle. During an extension or rebound stroke, a valving system in the piston limits the flow of hydraulic fluid within the pressure tube to produce a damping force. A check valve is included in the base valve to accommodate the "rod volume" flow of fluid. During a compression stroke, a valving system in the base valve limits the flow of hydraulic fluid between the lower working chamber and the reserve chamber to produce a damping force. A check valve is included in the piston to allow fluid to flow into the upper working chamber.

The piston rod of a shock absorber is supported at its lower end by the piston and it is slidingly received at the upper end of the pressure tube, and the reserve tube for a dual tube shock absorber, by a rod guide. The rod guide thus functions as a slide bearing for the piston rod. The rod guide properly positions the piston rod within the pressure tube and also acts as a closure member for both the pressure tube and the reserve tube when present. In order for the smooth sliding of the piston rod through the rod guide, a slight clearance is formed between the inner periphery of the bearing portion of the rod guide and the outer surface of the piston rod. This slight clearance allows for the hydraulic fluid to lubricate the interface between the piston rod and the rod guide.

In addition to locating the piston rod and closing the pressure tube and the reserve tube when present, the rod guide supports and locates a seal assembly which is designed to keep the hydraulic fluid within the shock absorber and also keep contaminants out of the shock absorber. The seal assembly normally interfaces between the rod guide and the piston rod and its purpose is to seal this interface in both rebound and compression strokes.

The prior art seal assemblies function well during a rebound stroke but they can be susceptible to leakage during a compression stroke. When the seal assembly is at zero velocity during the transition between rebound and compression, there is no residual force acting on the seal assembly. When the piston rod starts displacing in compression, the only initial force acting on the seal assembly is friction. This friction pulls the seal assembly down away from the rod guide until it meets the bearing bushing assembled with the rod guide. Depending on how well the bearing bushing is assembled, the dimensions of the bearing bushing and other related dimensions, the seal assembly then seals on the bearing bushing. The effectiveness of the seal is determined by how well the seal assembly and the bearing bushing are manufactured and the acting pressure (velocity) on the seal assembly. When the piston then displaces in rebound, the seal assembly will again be pushed upward against the sealing surface of the rod guide. This movement of the seal assembly between the rod guide and the bearing bushing provides a slight leaking of the hydraulic fluid. Typically, this leak is uncontrollable.

In addition to the problems associated with seal assembly movement, the problems associated with higher temperatures can cause leaking of the seal assembly. In applications which use the friction properties of the seal assembly for sealing, when higher temperatures are encountered, the seal assembly is again susceptible to leakage.

SUMMARY OF THE INVENTION

The present invention provides the art with a seal assembly which is always biased towards the rod guide sealing surface using a biasing member disposed between the seal assembly and the bearing bushing. The biasing of the seal assembly prohibits movement of the seal assembly during operation of the shock absorber and during the transitions between compression and rebound strokes. The present invention also provides a wire circlip which radially preloads the seal assembly. The radial preloading of the seal assembly maintains a constant friction/sealing relationship with the piston rod to compensate for temperature differences.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an enlarged cross-sectional view of a rod guide incorporating of dual action slip ring in accordance with another embodiment of the present invention; and FIG. 5 is an enlarged cross-sectional view of a rod guide incorporating of dual action slip ring in accordance with another embodiment of the present invention.

DETAILED DESCRIPTION OF THE PREFERRED EMBODIMENTS

Figure 1:
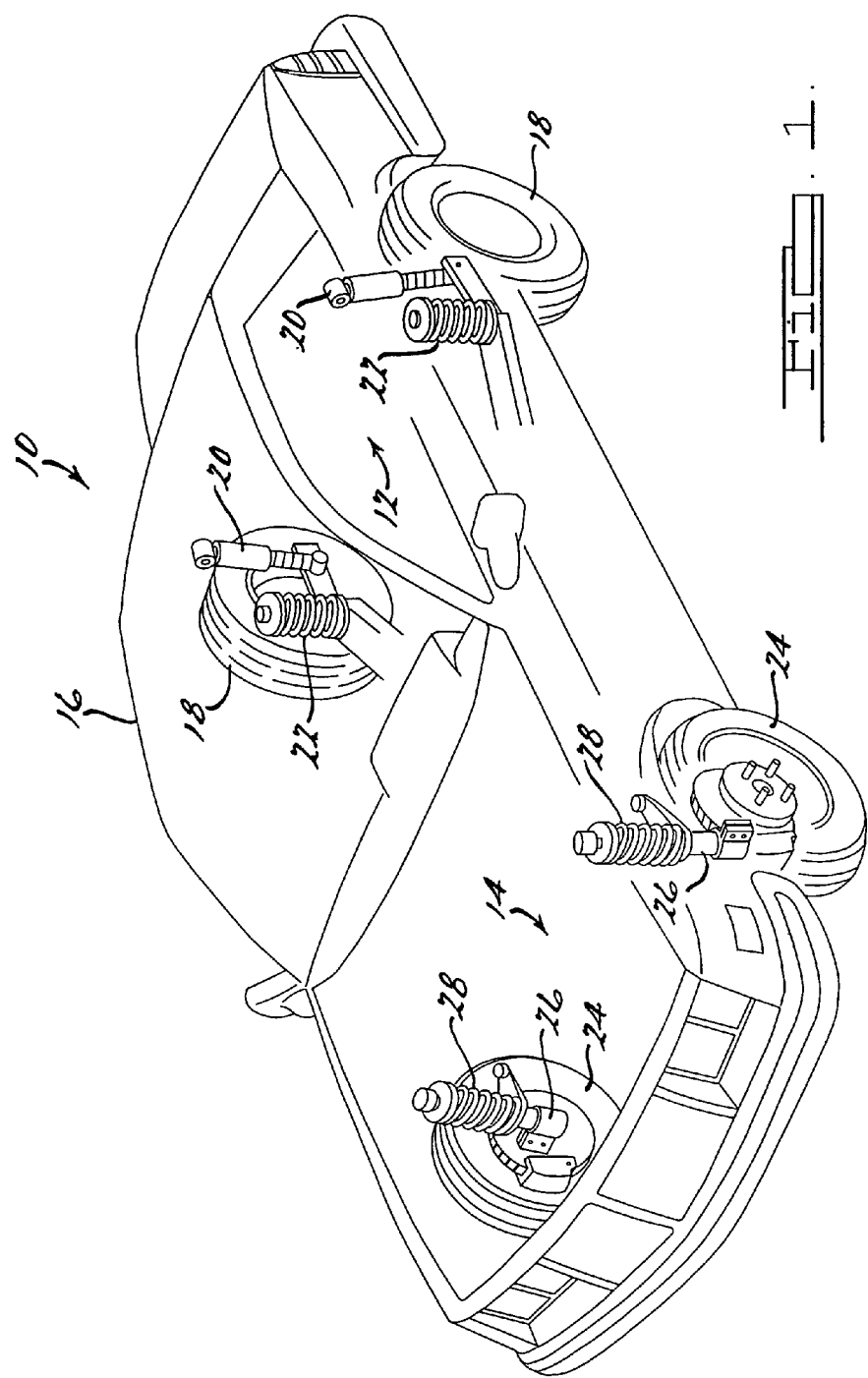
FIG. 1 is an illustration of an automobile using the dual action slip ring in accordance with the present invention.

Referring now to the drawings in which like reference numerals designate like or corresponding parts throughout the several views. The following description of the preferred embodiment(s) is merely exemplary in nature and is in no way intended to limit the invention, its application, or uses. There is shown in FIG. 1, a vehicle incorporating shock absorbers which include the unique slip ring design in accordance with the present invention and which is designated generally by the reference numeral 10. Vehicle 10 includes a rear suspension system 12, a front suspension 14 and a body 16. Rear suspension system 12 includes a pair of rear suspension arms adapted to operatively support a pair of rear wheels 18. Each rear suspension arm is attached to body 16 by means of a shock absorber 20 and a helical coil spring 22. Similarly, front suspension system 14 includes a pair of suspension arms adapted to operatively support a pair of front wheels 24. Each suspension arm is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12, 14) with respect to the sprung portion (i.e., body 16) of vehicle 10. While vehicle 10 has been depicted as a passenger vehicle having independent front and rear suspension 12 and 14, shock absorbers 20 and 26 may be used with other types of vehicles having other types of suspension and springs or in other types of applications including, but not limited to, vehicles incorporating air springs, leaf springs, non-independent front and/or non-independent rear suspension systems. Further, the term "shock absorber" as used herein is meant to refer to dampers in general and thus will include MacPherson struts, spring seat units as well as other shock absorber designs known in the art.

Figure 2:
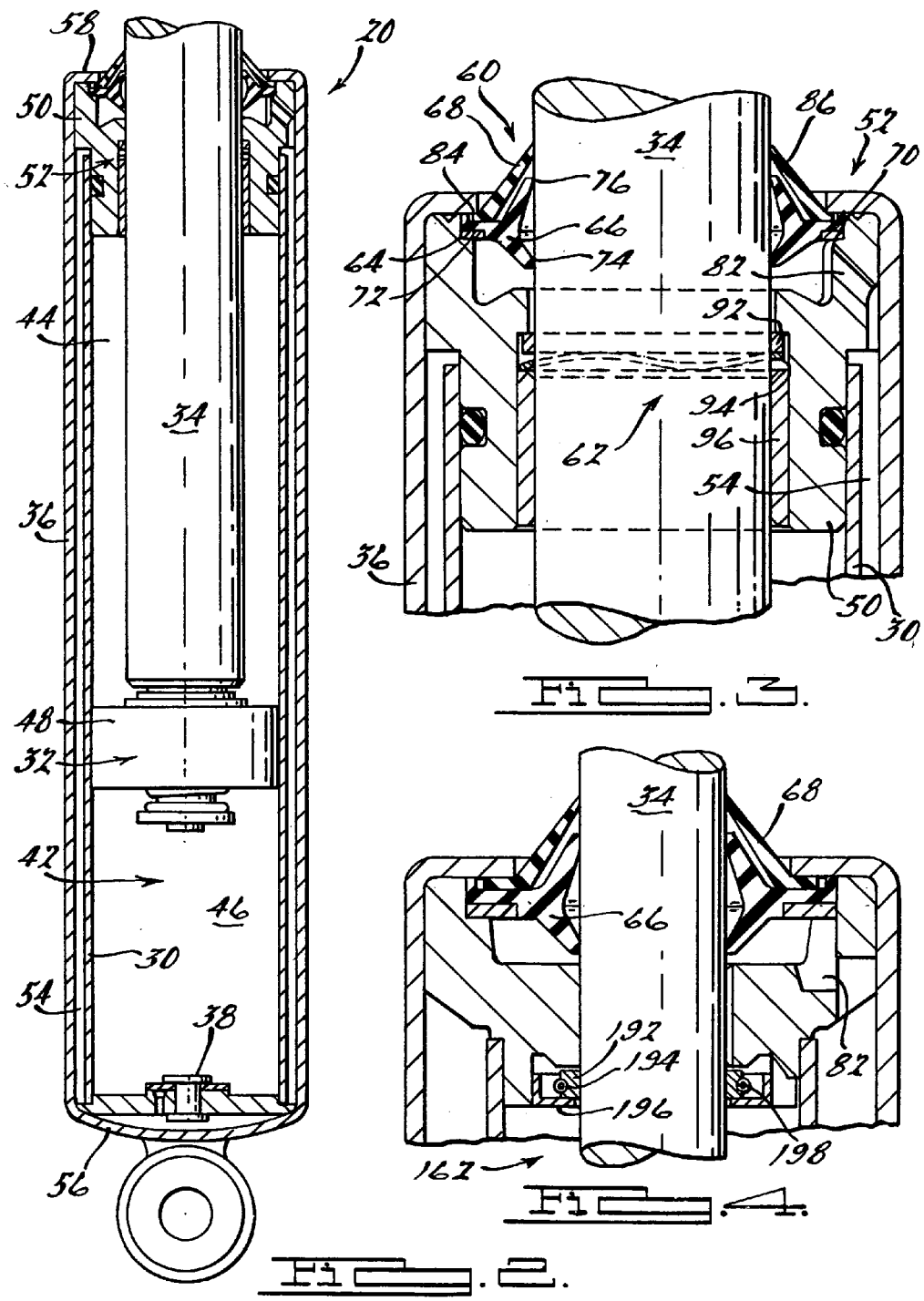
FIG. 2 is a cross-sectional view of a shock absorber shown in FIG. 1 incorporating the dual action slip ring in accordance with the present invention.

Referring now to FIG. 2, rear shock absorber 20 is shown in greater detail. While FIG. 2 shows only rear shock absorber 20, it is to be understood that front shock absorber 26 is also designed to include the slip ring in accordance with the present invention. Front shock absorber 26 only differs from rear shock absorber 20 in the way it is adapted to be connected to the sprung and unsprung portions of vehicle 10. Shock absorber 20 comprises a pressure tube 30, a piston 32, a piston rod 34, a reserve tube 36 and a base valve assembly 38.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper rod guide 50 which closes the upper end of both pressure tube 30 and reserve tube 36. A unique sealing system 52 seals the interface between rod guide 50, reserve tube 36 and piston rod 34. The end of piston rod 34 opposite to piston 32 is adapted to be secured to the sprung portion of vehicle 10. Valving within piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 when compared with the amount of fluid displaced in lower working chamber 46. This difference in the amount of fluid displaced is termed the "rod volume" and it flows through base valve assembly 38.

Reserve tube 36 surrounds pressure tube 30 to define a reserve chamber 54 located between the tubes. The bottom end of reserve tube 36 is closed by an end cap 56 which is adapted to be connected to the unsprung portion of vehicle 10. The upper end of reserve tube 36 is attached to rod guide 50 by mechanically deforming the open end of reserve tube 36 to form a retaining flange 58. Base valve assembly 38 is disposed between lower working chamber 46 and reserve chamber 54 to control the flow of fluid, the "rod volume" of fluid between the two chambers. When shock absorber 20 extends in length (rebound), an additional amount of fluid, the "rod volume", is needed in lower working chamber 46. Thus, fluid will flow from reserve chamber 54 to lower working chamber 46 through base valve assembly 40. When shock absorber 20 shortens in length (compression), and excess of fluid, the "rod volume", must be removed from lower working chamber 46. Thus, fluid will flow from lower working chamber 46 to reserve chamber 54 through base valve assembly 40.

The present invention is directed to the unique sealing system 52 which operates to keep hydraulic fluid within shock absorber 20 while keeping dirt and other contaminants from entering shock absorber 20.

Figure 3:
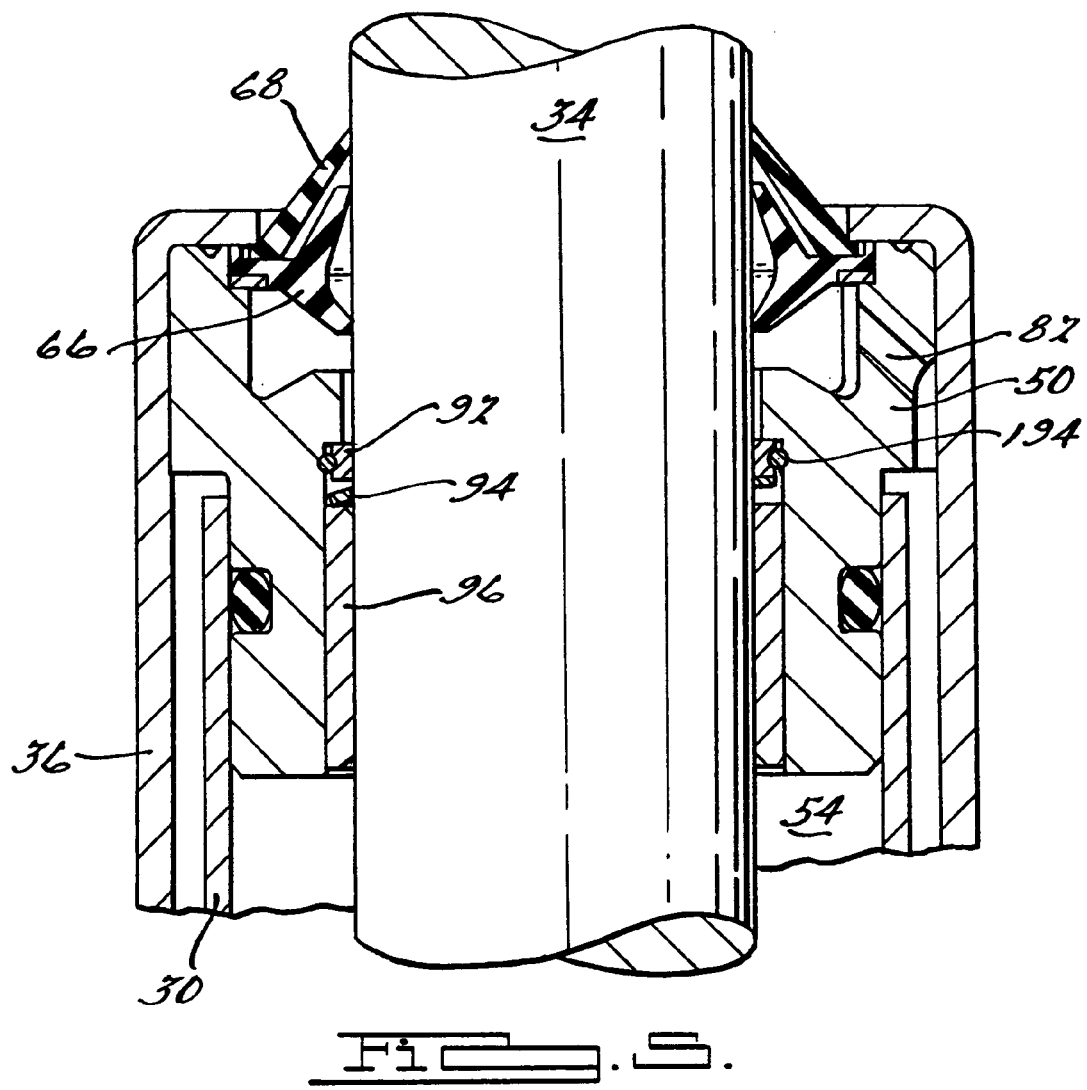
FIG. 3 is an enlarged cross-sectional view of the rod guide for the shock absorber shown in FIG. 2.

Referring now to FIG. 3, sealing system 52 comprises an upper seal assembly 60 and a lower seal assembly 62. Upper seal assembly 60 comprises a positioning ring 64, a damper seal 66 and a dirt wiper 68. Positioning ring 64 is a metal or a plastic positioning ring which is seated on an annular shoulder 70 defined by rod guide 50.

Damper seal 66 is an elastomeric seal which defines an annular groove 72 within which positioning ring 64 is located. Positioning ring 64 can be a separate component or positioning ring 64 can be bonded to damper seal 66 during or after the molding operation for damper seal 66. The outer diameter of damper seal 66 sealingly engages rod guide 50. Damper seal 66 defines a lower annular seal lip 74 that engages piston rod 34 at a position below shoulder 70 of rod guide 50 and an upper annular seal lip 76 that engages piston rod 34 at a position above shoulder 70 of rod guide 50. Lower annular seal lip 74 acts primarily as a seal which keeps hydraulic fluid within shock absorber 20. Any hydraulic fluid which may adhere to the outer surface of piston rod 34 after having past lower seal assembly 62 will be wiped off of piston rod 34 and returned to reserve chamber 54 through a fluid de-aeration passage 82 extending through rod guide 50. While acting as a secondary oil seal, lower annular seal lip 74 will also act to stop dirt and contamination from entering shock absorber 20. Upper annular seal 76 acts primarily as a seal which keeps dirt and other contaminants out of shock absorber 20. Any dirt or contaminants located on the outer surface of piston rod 34 will be wiped off by upper annular seal lip 76. While acting primarily as a dirt seal, upper annular seal lip 76 will also act as an oil seal to keep hydraulic fluid within shock absorber 20.

Dirt wiper 68 is a hard plastic component, preferably Teflon®, which includes an annular section 84 and a frusto-conical section 86. Annular section 84 rests within an annular groove formed in the upper surface of damper seal 66. Frusto-conical section 86 extends upward from annular section 84 over upper annular seal 76 to provide protection for damper seal 66. The upper end of frusto-conical section 86 defines a lip which rides against piston rod 34 and operates to wipe or remove any dirt, water or contaminants adhering to piston rod 34. The stiffness of the hard plastic of dirt wiper 68 enables it to remove contaminants which could possibly damage portions of damper seal 66.

Lower seal assembly 62 comprises a slip ring 92 and a biasing member 94. The present invention optimizes the function of slip ring 92 under all temperature conditions and/or it guarantees full function of slip ring 92 in both rebound and compression strokes of shock absorber 20. Slip ring 92 is positioned above a bearing 96 press fitted into rod guide 50. Biasing member 94 biases slip ring 92 against rod guide 50 to provide the necessary sealing for shock absorber 20. While biasing member 94 is illustrated as a wave washer, other biasing members including, but not limited to, rubber washers or coil springs could be utilized for the biasing of slip ring 92.

Slip ring 92 slidingly engages piston rod 34 to provide the primary oil seal for shock absorber 20. Typically, the prior art refers to a slip ring as being a component sealing the rod guide—piston rod leak during both a rebound stroke and a compression stroke. The inventors of the present invention have found that while a slip ring functions well during a rebound stroke, it does not function adequately during a compression stroke.

The inventors of the present invention determined that when piston rod 34 is at zero velocity during the transition between rebound and compression, there is no residual force acting on slip ring 92. When piston rod 34 starts displacing in compression, the only initial force acting on slip ring 92 is the friction with piston rod 34. This friction will pull slip ring 92 down until it meets bearing 96. Depending on how well bearing 96 is assembled, the dimensions of bearing 96 and the like, slip ring 92 will engage and seal against bearing 96 after a small movement of piston rod 34. Depending on how well this slip ring-bearing seal is and the acting pressure of engagement between slip ring 92 and bearing 96 due to the velocity of piston rod 34, the fluid pressure within shock absorber 20 will push slip ring 92 back against the sealing surface of rod guide 50 again. This cyclical movement of slip ring 92 creates a leak. The cracking point for the leak is very uncontrollable as well as the leak itself when attempting to seal the slip ring-bearing interface. In practice, the leak in compression is uncontrollable.

Biasing member 94 preloads slip ring 92 against the sealing surface of rod guide 50. Thus, during the transitions between rebound and compression, and during the entire operation of shock absorber 20, slip ring 92 does not move. This guarantees a controllable sealing interface between slip ring 92 and piston rod 34 with de-aeration passage 82 returning the hydraulic fluid bypassing slip ring 92 to reserve chamber 54.

Referring now to FIG. 4, a lower seal assembly 162 in accordance with another embodiment of the present invention is illustrated. Lower seal assembly 162 comprises a slip ring 192, a biasing member 194 and a retainer 196. Biasing member 194 is a circlip which is located in a groove 198 defined by the outer surface of slip ring 192. Biasing member 194 urges slip ring 192 into engagement with piston rod 34. The use of biasing member 194 allows for control of the friction/sealing between piston rod 34 and slip ring 192. Retainer 196 positions slip ring 192 with respect to rod guide 50 to control the slip ring to rod guide sealing as described above for slip ring 92. As illustrated in FIG. 5, it is within the scope of the present invention to utilize biasing member 194 in conjunction with biasing member 94 in place of retainer 196.

Due to the properties required to seal under high pressures, slip ring 192, which is preferably manufactured from bronze filled Teflon®, changes its sealing/friction properties with the changes in temperature. The incorporate of biasing member 194 allows for consistency in the friction/sealing interface between slip ring 192 and piston rod 34 by radially preloading slip ring 192.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
   a pressure tube defining a working chamber;
   a piston disposed within said working chamber, said piston dividing said working chamber into an upper working chamber and a lower working chamber;
   a piston rod attached to said piston, said piston rod extending from said piston through one end of said pressure tube;
   a rod guide disposed between said one end of said pressure tube and said piston rod; and
   a sealing system disposed between said rod guide and said piston rod, said sealing system comprising:
   a slip ring disposed between said piston rod and said rod guide, said slip ring slidingly engaging said piston rod;
   a first biasing member urging said slip ring into engagement with one of said piston rod and said rod guide; and
   a second biasing member urging said slip ring into engagement with the other of said piston rod and said rod guide.

2. The shock absorber in claim 1 wherein said first biasing member urges said slip ring into engagement with said rod guide.

3. The shock absorber in claim 2 wherein said shock absorber further comprises a bearing disposed between said rod guide and said piston rod, said first biasing member being disposed between said bearing and said slip ring.

4. The shock absorber in claim 3 wherein said first biasing member is a wave washer.

5. The shock absorber in claim 1 wherein said shock absorber further comprises a bearing disposed between said rod guide and said piston rod, said first biasing member being disposed between said bearing and said slip ring.

6. The shock absorber in claim 5 wherein said first biasing member is a wave washer.

7. The shock absorber in claim 1 wherein said first biasing member is a wave washer.

8. The shock absorber in claim 1 wherein said second biasing member urges said slip ring into engagement with said piston rod.

9. The shock absorber in claim 8 wherein said second biasing member is a circlip.

10. The shock absorber in claim 8 further comprising a retainer for positioning said slip ring with respect to said rod guide.

11. The shock absorber in claim 10 wherein said second biasing member is a circlip.

12. The shock absorber in claim 11 wherein said first biasing member is a wave washer.

* * * * *